Figure 1:
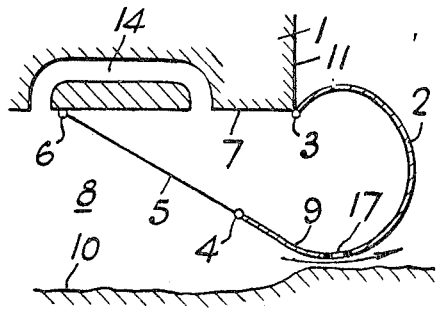

Dec. 13, 1966 L. A. HOPKINS ETAL 3,291,237
VEHICLES FOR TRAVELLING OVER A SURFACE
Filed Oct. 17, 1963 4 Sheets-Sheet 2
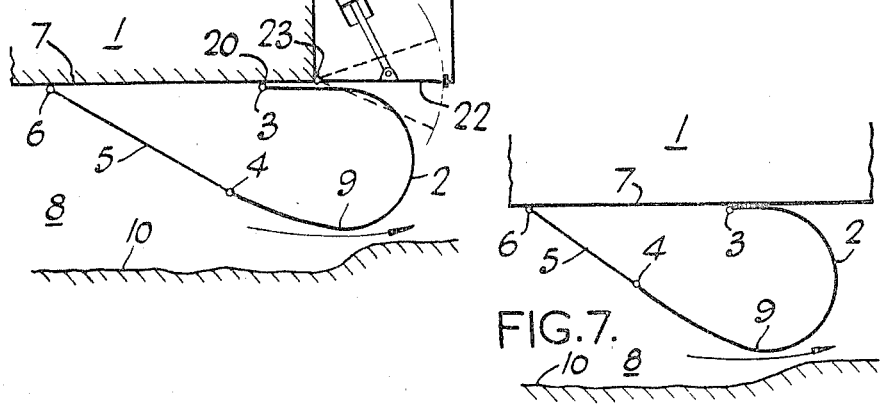
FIG. 5.
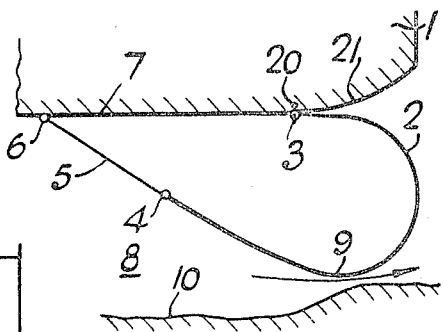
FIG. 6.
FIG. 7.
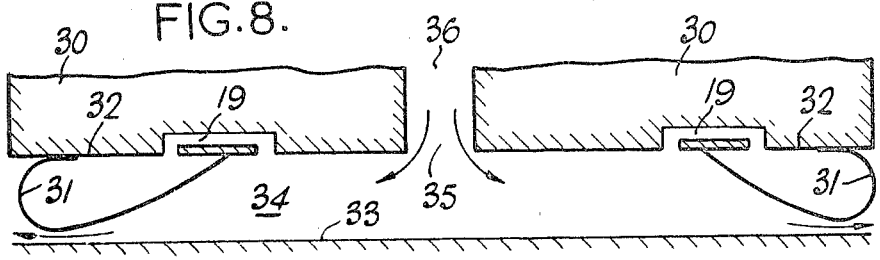
FIG. 8.
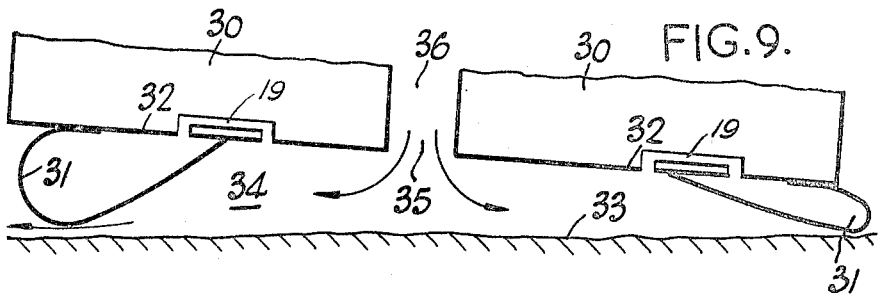
FIG. 9.
INVENTORS
L. A. HOPKINS
A. R. TRIPP
BY Cameron, Kerkam & Sutton
ATTORNEYS

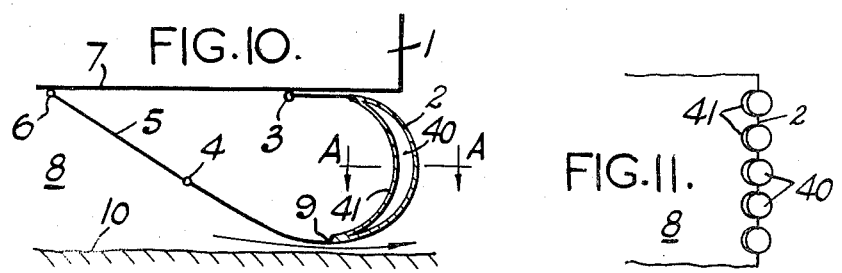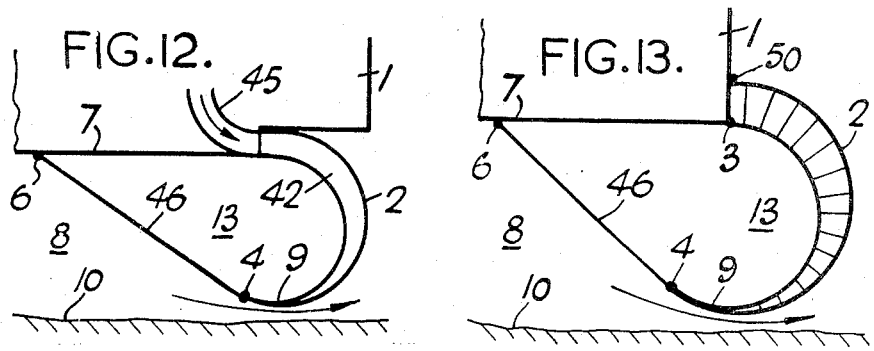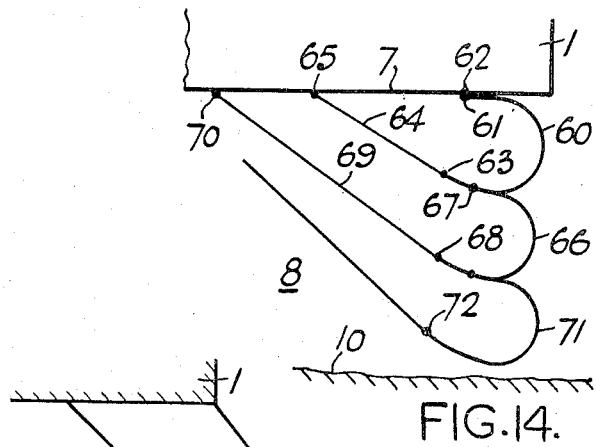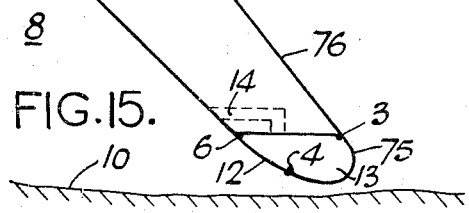

United States Patent Office 3,291,237
Patented Dec. 13, 1966

3,291,237
VEHICLES FOR TRAVELLING OVER A SURFACE
Leslie Arthur Hopkins, Hythe, and Alan Ritson Tripp, Southampton, England, assignors to Hovercraft Development Limited, London, England, a British company
Filed Oct. 17, 1963, Ser. No. 316,852
Claims priority, application Great Britain, Oct. 18, 1962, 39,546/62
17 Claims. (Cl. 180—7)

This invention relates to vehicles for travelling over a surface and which are supported above that surface by one or more cushions of pressurised gas contained beneath the vehicle, at least in part, by downwardly depending members in the form of walls or skirts. It has been proposed to make such walls or skirts of flexible material, they being attached at their top edges to the bottom of the vehicle. A difficulty arises with such members in that their bottom edges are liable to suffer considerable damage from contact with the surface over which the vehicle is travelling or obstacles in the path of the vehicle. Further, whilst any members extending across the front of a vehicle can be arranged to deflect relatively easily inwards, against the pressure of the gaseous cushion, rearwardly of the vehicle, members extending across the rear of a vehicle cannot be arranged to deflect in this way because they must be constructed to resist the pressure of the cushion which, of course, is outwards at the rear of the vehicle. There is therefore a tendency for such members at the rear to "dig-in" and suffer extensive damage.

The present invention is directed to the provision of structures for flexible skirt members for this purpose and it will be seen that by the expedients according to the invention it is possible to achieve structures which are more readily deformable in a vertical direction so as thereby to be less susceptible of damage.

Another feature which may be achieved in the structures to be described hereinafter is the provision of an improved cross-sectional shape for the passage presented to the gas which in operation escapes outwardly from the pressurised cushion through the gap between the skirt members and the surface over which the vehicle is travelling. It can be arranged that the cross-sectional shape of the passage presented to the escaping gas is one which will produce a pressure distribution acting on the lower part of the structure which tends at all times to maintain a clearance between the lower part of the structure and the surface over which the vehicle is operating.

In some circumstances moreover and in some of the examples described, flexible structures according to the invention enable a stabilising effect to be exerted on the vehicle by the deformation of the flexible skirt when a variation in attitude of the vehicle relative to the surface tends to reduce the clearance between the bottom of the main body of the vehicle and the surface over which it is travelling.

The structures according to the invention take the form of relatively thin-walled flexible skirt members which form at least part of the boundary of a pressurised gas cushion by which the vehicle is at least in part supported, such a skirt member being attached to the lower part of the vehicle and inflated by the gas cushion itself or separately, in such a way that, as seen in cross-section, it extends initially in a direction having at least a component outwardly away from the cushion area of which the member forms a boundary part, thereafter extending downwardly and inwardly and then again upwardly so as to present on its lower surface a convex face which is presented towards the surface over which the vehicle is to travel. The member may be attached at one edge to the lower part of the vehicle and it may extend in the path above defined to a second edge extending parallel to the first and supported in any suitable manner at a suitably spaced location with respect to the first edge to achieve, when inflated, the desired shape. The second edge may, for example, be supported by flexible means connecting it to the lower part of the vehicle at a suitable position to ensure that the desired shape is achieved when the skirt is inflated. Alternatively it could be located in the appropriate position by rigid means depending from the bottom of the vehicle.

A flexible skirt member according to the invention may extend in its initial outward direction beneath a surface on or extending from the lower part of the vehicle. The upper part of the skirt may move into contact with the surface on or extending from the lower part of the vehicle when deflected upwards so as to extend the effective area of the gas cushion at that locality. This has the effect of moving the centre of pressure of the cushion towards said locality relative to the vertical axis passing through the centre of gravity of the vehicle. Alternatively the upper part of the skirt may be in contact with the surface on or extending from the lower part of the vehicle during normal operation of the vehicle, the extent of the contact varying with the deflection of the skirt, up or down, so as to vary the effective area of the gas cushion at that location. Again this variation of the effective area will vary the position of the centre of pressure of the cushion relative to the vertical axis passing through the centre of gravity of the vehicle. In this way the stabilising effect above referred to can be achieved.

Figure 16:
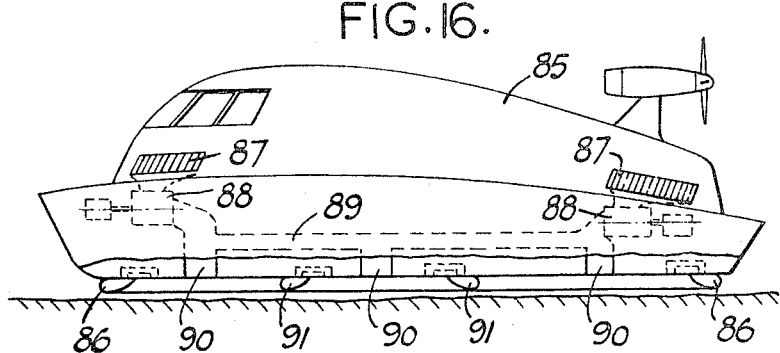
Figure 17:
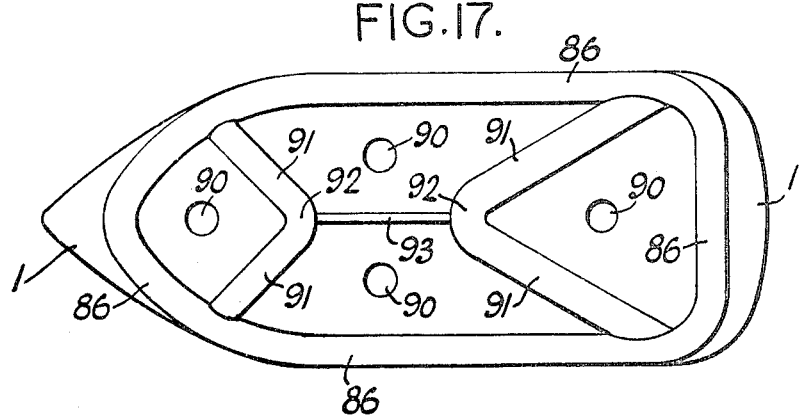

Further features of the invention will appear from the following description of a number of embodiments given with reference to the accompanying drawings in which:

FIGURE 1 is a diagrammatic vertical cross-section through the lower part of a periphery of a vehicle embodying one form of the invention, FIGURES 2, 3, 4, 5 and 6 are similar cross-sections to that of FIGURE 1 illustrating modifications thereof, FIGURE 7 is a diagrammatic vertical cross-section through a lower part of a vehicle, embodying a form of the invention, FIGURE 8 is a diagrammatic vertical cross-section through a vehicle illustrating one operating condition thereof, FIGURE 9 is a similar cross-section to that of FIGURE 8 illustrating an alternative operating mode, FIGURE 10 is a similar cross-section to that of FIGURE 1 illustrating a further embodiment of the invention, FIGURE 11 is a cross-section on the line A—A of FIGURE 10, FIGURES 12 and 13 are similar cross-sections to FIGURE 10 and illustrate modifications thereof, FIGURE 14 is a similar cross-section to FIGURE 1 and illustrates yet another embodiment of the invention, FIGURE 15 is a similar cross-section to FIGURE 1 and illustrates a further embodiment of the invention, FIGURE 16 is a side elevation of a vehicle embodying the invention, the lower part being shown in section, and FIGURE 17 is an inverted plan view of the vehicle illustrated in FIGURE 16.

The examples of FIGURES 1 to 7 illustrate a cushion containing means for the vehicle 1, comprising a flexible member 2 in the form of a thin sheet of flexible material which extends laterally in the direction of the cushion periphery. In the examples of FIGURES 1 to 6 the periphery of the cushion coincides more or less with the periphery of the lower part of the vehicle, whilst in FIGURE 7 the flexible member 2 is shown bounding a cushion periphery which is inboard of the vehicle periphery, such as would occur if the flexible member was subdividing the total cushion space beneath a vehicle.

In FIGURE 1, one edge 3 of the flexible member 2 is attached to the periphery of the bottom of the vehicle. The other edge 4 is connected by means of cords or the like 5 to a position 6 on the bottom surface 7 of the vehicle. Air is supplied to the space 8 to form a cushion of pressurised air which supports the vehicle and the air causes the member 2 to assume a freely inflated shape as shown. Once the cushion has been formed, excess air flows out beneath the curved bottom face 9 of the flexible member 2. Under the action of the pressure inside the flexible member 2 and the flow of air beneath the curved face 9 the curved face assumes a profile which has a pressure distribution which tends to keep it at all times clear of the surface 10. This therefore reduces the possibility of damage. When the clearance between the bottom surface 7 of the vehicle and the surface 10 decreases, the flexible member 2 deflects upwards rolling up in contact with the outer surface 11 of the vehicle.

Instead of using cords 5 to connect the edge 4 of the flexible member to the bottom surface of the vehicle, it is possible to use a diaphragm or web, the flexible member together with the diaphragm or web and the bottom surface of the vehicle forming a closed shape.

Figure 2:
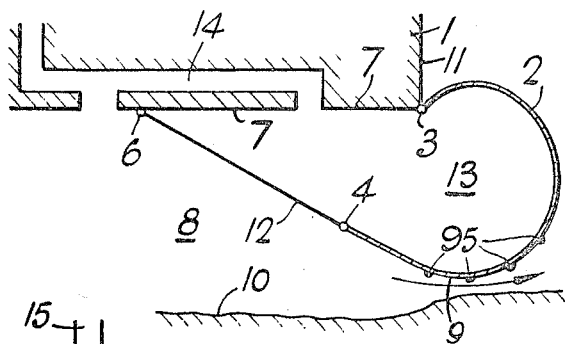
Figure 3:
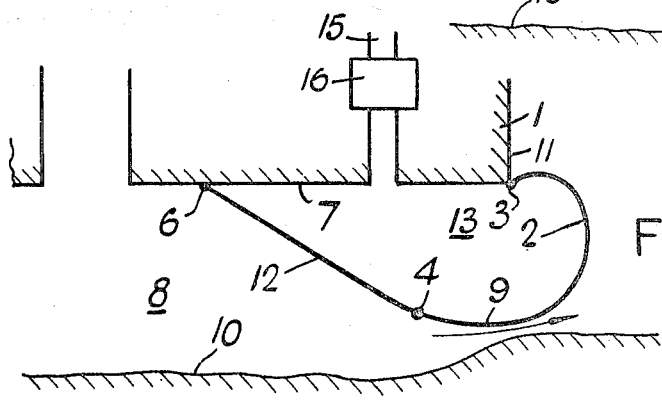

FIGURE 2 illustrates a modification of FIGURE 1 in which the cords 5 are replaced by a diaphragm or web 12 forming a closed space 13. As shown in FIGURE 2, air is fed to this space 13 from the cushion space 8 via a duct 14, the pressure in space 13 being arranged to be at or slightly above the normal cushion pressure. To improve the stability of deflection of the flexible member 2, one or more discontinuities, such as steps, ridges or the like, may be made in or attached to the lower face of the member. For example, as illustrated in FIGURE 2, a plurality of rubber beads 95 may be attached to the curved face 9 at spaced positions in rows extending substantially normal to the cushion periphery. Such discontinuities form a definite break-away position of the air flow beneath the curved face, reducing the possibility of oscillation of the member. An alternative modification of that illustrated in FIGURE 2, in which a separate air supply to the space 13 is provided, is illustrated in FIGURE 3. The air supply via a duct 15 can be at the same pressure as the normal cushion pressure or at some different pressure. Further, the pressure to the space 13 can be varied by means of a control valve 16, thus varying the action of the flexible member. For example, it could be advantageous to increase the pressure in space 13 when the vehicle is heavily laden and reduce it when it is lightly laden.

The use of a diaphragm or web as shown in FIGURES 2 or 3 is likely to be preferred as this avoids the possibility that foreign matter such as water, earth, sand, and the like will collect inside the flexible member and interfere with its operation. The diaphragm or web 12 can be in the form of a separate member attached to the edge 4 of the flexible member, being of similar or dissimilar material, or may be formed in one with the flexible member. For operation over water, some alleviation of the difficulty of collecting water inside the flexible member illustrated in FIGURE 1 can be obtained by providing small drainage holes 17 in the bottom face 9.

Figure 4:
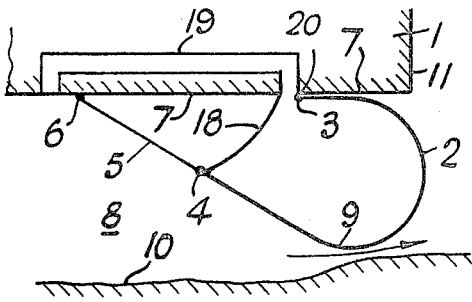

The stability of a vehicle can be improved by making the attachment point of the edge 3 of the flexible member inboard of the outermost extremity of the bottom surface of the vehicle. As shown in FIGURE 4, the vehicle is at its normal operating height and the flexible member 2 extends outwards from the point of attachment 20 in contact with the bottom surface 7 for a short distance. The bottom surface 7 extends for a further short distance outwards. This arrangement provides a stabilising effect in that if the vehicle bottom approaches more closely to the surface, the flexible member 2 deflects upwards and more of the member comes in contact with the bottom surface 7 of the vehicle. This moves the periphery of the cushion outwards at this locality and provides a thrust tending to restore the clearance. The reverse occurs when the clearance increases above the normal.

Also illustrated in FIGURE 4 is a further modification which can be made to FIGURE 1. The edge 4 of the flexible member 2 is connected to the bottom surface 7 of the vehicle by cords or the like 5 and to avoid collecting foreign matter inside the flexible member a membrane or the like 18 is positioned between the edge 4 and the bottom surface 7. The membrane 18 is attached at its top edge to the bottom surface 7 at a position adjacent to the position 20 at which the edge 3 of the flexible member is attached to the bottom surface 7. To inflate the flexible member a duct 19 connects the cushion space 8 to the space formed by the flexible member 2 and the membrane 18. Alternatively a separate air supply can be provided as illustrated in FIGURE 3.

The effect of the bottom surface 7 extending beyond the point of attachment 20 can be varied by shaping or profiling the extended portion as shown at 21 in FIGURE 5. Alternatively, the extended portion can be hinged to the main vehicle body as in FIGURE 6. In FIGURE 6, the extended portion 22 is hinged at 23 to the main body 1. It is pivoted about the hinge 23 by a hydraulic jack 24. The extended portion 22 can thus be positioned at, above or below the horizontal.

Flexible members according to the invention can also be used for dividing the cushion space beneath the vehicle into separate compartments. This is illustrated in FIGURE 7. The attachment of the edges 3 and 4 of the flexible member is similar to FIGURE 4, except that the member is not adjacent to the vehicle periphery.

In the examples illustrated in FIGURES 4, 5, 6 and 7, instead of cords being used to connect the edge 3 of the flexible member to the vehicle bottom surface, diaphragms or webs as in FIGURES 2 and 3 can be used. In this case, the membrane 18 in FIGURE 4 can be dispensed with. Also the air supplies can be provided as illustrated in FIGURE 2 or as in FIGURE 3.

FIGURES 8 and 9 illustrate one form of operation of the invention. The figures show the bottom of a vehicle 30, having a flexible member 31 attached to the periphery of the bottom surface 32. The particular example illustrated is generally as in FIGURE 2. In FIGURE 8 the vehicle is shown on an even keel, having a constant clearance between its bottom surface 32 and the surface 33 over which it is operating. Air is supplied to the space 34, to form a cushion of pressurised air, through the port 35 via duct 36.

When the vehicle tilts, as in FIGURE 9, the flexible member deflects into contact with the bottom surface 32 at the position where the clearance between the bottom surface and the surface 33 decreases. At the position where the clearance increases, the flexible member 31 deflects away from the bottom surface 32. Thus, as will be seen, there is an effective movement of the supporting cushion relative to the vehicle, and thus a movement of the centre of pressure of the cushion relative to the vertical axis passing through the centre of gravity of the vehicle, which assists in stabilising the vehicle. When the vehicle moves as a whole vertically, then deflections of the flexible member occur in a sense to oppose such movements.

The flexible member can be stiffened at any locality desired. FIGURES 10 and 11 illustrate a form of the invention in which part of the flexible member 2 is stiffened by means of generally vertically extending inflated tubes 40. The tubes 40 are separated laterally one from the other and a sheet of flexible material 41 is positioned on the inside of the tubes to provide an air-tight seal. Other forms of stiffening may be provided such as rubber, plastic or metal strips.

A modification of the example illustrated in FIGURES 10 and 11 is illustrated in FIGURE 12. In this example the flexible member 2 is stiffened by inflatable tubes 42 which can be separate from one another and lined with an inner sheet of material, as in FIGURES 10 and 11, or can be joined together to form an air-tight seal. Provision is made to supply air via a duct 45 to inflate tubes 42. The tubes can be inflated to a constant pressure or the inflation pressure can be varied. In FIGURE 12 the edge 4 is shown attached to the bottom of the vehicle by a diaphragm 46, but cords can be used as in FIGURE 10.

FIGURE 13 illustrates a further modification of FIGURE 10 in which the stiffening tubes are connected directly at 50, to the periphery of the vehicle bottom instead of by a flexible extension as in FIGURE 10. Again, the edge 4 is shown connected to the bottom surface of the vehicle by a diaphragm 46, but the edge can be connected by cords as an alternative.

With stiffened parts as in FIGURES 10 to 13, by attaching the lower edge 4 by means of a diaphragm to form a separate gas-tight space with a separate air supply, as described above in relation to FIGURE 3, it is possible to relate differentially the cushion pressure, the pressure in the space and the inflation pressure of the stiffening means to give desired characteristics of deflection.

A number of flexible members can be positioned one above the other, as illustrated in FIGURE 14. In this embodiment a flexible member 60 is attached at one edge 61 to the bottom surface 7 of the vehicle at a position 62 a short distance in from the vehicle periphery. The other edge 63 is connected to the bottom surface 7 by a diaphragm or cords 64 at a position 65 inboard of the attachment position 62 of the edge 61. This arrangement so far is generally as FIGURE 4. A further flexible member 66 is positioned below flexible member 60, one edge 67 being connected to the bottom surface 7 of the vehicle via flexible member 60. The other edge 68 of the flexible member 66 is connected to the bottom surface 7 of the vehicle by a diaphragm or cords 69.

The diaphragm or cords 69 can be taken direct to a separate attachment position 70 inboard of the position 65. Alternatively the diaphragm or cords 69 can be taken to the position 65, or even attached to the diaphragm or cords 64 and thus attached to the bottom surface 7 via the diaphragm or cords 64. A further flexible member 71 can be positioned below the flexible member 66. Where the edges 63 and 68, and also the corresponding edge 72 of flexible member 71, are attached to the vehicle by means of diaphragms, the separate airtight spaces so formed can be inflated at different pressures.

Flexible members can be attached to the bottom parts of extensions of the lower part of the vehicle. Thus the examples described above and illustrated in the drawings can be attached to the bottom surface of a rigid extension, a flexibly attached extension or a flexible extension. FIGURE 15 illustrates the attachment of a flexible member 75, generally of the form illustrated in FIGURE 2, to the bottom surface of a flexible extension 76. Such an arrangement provides a two stage effect.

To provide for lengthwise stretch of a member to accommodate local deflection of the member, the material can be extensible in the direction of the length of the member. Alternatively or in addition, the material may be corrugated.

Although the invention provides an arrangement which tends to keep the bottom face of the flexible member clear of the surface, occasional contact is likely to occur. Also, when the vehicle is at rest on a hard surface, with the cushion not in being, the vehicle may be resting on all or part of the flexible member. To avoid undue erosion of the flexible member, abrasion resistant material can be attached to various parts of the member.

Further, if a separate source of supply of air is provided to the space 13 in the arrangement illustrated in FIGURE 3, and the arrangements in FIGURES 4 to 7 when suitably modified, then the member can be inflated by pumping air into the space 13 when the cushion is not in being and the flexible member may then support all or part of the vehicle weight.

FIGURES 16 and 17 illustrate a vehicle 85 in which flexible members according to the present invention are used both to contain the cushion of pressurised air at the periphery of the bottom surface of the vehicle and also to subdivide the cushion into compartments. A flexible member 86, similar to the embodiment illustrated in 4, extends round the periphery of the bottom surface of the vehicle. Air is drawn in through intakes 87 by compressors 88, the air being fed to a plenum chamber 89 from which the air issues into the cushion space through ports 90. The cushion space beneath the vehicle is subdivided by flexible members 91 which again are similar to the embodiment illustrated in FIGURE 4. The flexible members 91 extend in V formations from the front and rear of the vehicle, the points 92 of the V's being towards each other. The points of the V's are connected by a further flexible member 93 which, in the example illustrated, is in the form of a simple vertical sheet of flexible material. It will be appreciated that other forms of flexible members can be used to subdivide the cushion space, or curtains of moving fluid can be used, or combinations of flexible members and fluid curtains.

Although in the examples described above the cushion has been considered as being formed of air, other gases, such as exhaust gases and mixtures of air and exhaust gases, can be used. The separate supply of gas to the flexible member, where provided, can also be of any suitable gas.

We claim:

1. A vehicle for travelling over a surface of the type which is supported above the surface by at least one cushion of pressurised gas formed and contained in a space beneath the vehicle, including a flexible skirt attached to the lower part of the vehicle containing the cushion for at least part of its periphery, said skirt comprising at least one inflatable, gas-retaining thin walled flexible member having first and second edges, the cross-sectional shape of said member normal to the periphery of the cushion space being a substantially continuous curve extending from said first edge initially in a direction outwardly away from the cushion space, thereafter extending downwardly and then inwardly and then upwardly, ending in said second edge, so as to present on its lower surface a continuous convex face which is presented towards the surface over which the vehicle is supported, the first edge of said flexible member being attached to the bottom surface of the vehicle and the second edge thereof lying below and being movable relative to said bottom surface, and flexible means connecting the second edge of said flexible member to the bottom surface of the vehicle at a position inwards towards the centre of the cushion space relative to the position of said second edge, means for supplying gas directly to the cushion space without passing through the space within said flexible member, said flexible member being normally inflated to a pressure substantially equal to the cushion pressure and being free of internal restraint, whereby, under the action of the inflation pressure within said member and the flow of gas outwardly from the cushion space beneath the convex lower surface of said member, said member assumes a profile having a pressure distribution tending to maintain said lower surface clear to the surface over which the vehicle is supported, said flexible member being free to deflect both upwardly and downwardly from a normal position and to change in shape upon variations in the distance between the bottom surface of the vehicle and the surface over which the vehicle is supported, an upwards deflection of any portion of said flexible member also causing an outward deflection thereof so that the centre of pressure of the vehicle supporting cushion moves outwardly towards said portion and thereby exerts a stabilising effect on the vehicle.

2. A vehicle as claimed in claim 1 wherein the flexible means connecting the second edge of the flexible member to the bottom surface of the vehicle comprises a gas-tight diaphragm which cooperates with the flexible member to form a closed space, and including means for supplying gas to the interior of said closed space.

3. A vehicle as claimed in claim 2, wherein the first-named gas supply means supplies gas to the cushion space independently of the gas supply to said closed space.

4. A vehicle as claimed in claim 3 including means for varying the pressure of the gas supply to said closed space independently of the pressure of the gas supply to the cushion space.

5. A vehicle as claimed in claim 1 wherein the flexible means connecting the second edge of the flexible member to the bottom surface of the vehicle comprises a gas-tight membrane attached at its lower edge to the second edge of the flexible member and at its upper edge to the bottom surface of the vehicle at a position inboard of but adjacent to the position at which the first edge of the flexible member is attached to the bottom surface of the vehicle, said membrane cooperating with said flexible member to form a closed space, and including means for supplying gas to said closed space.

6. A vehicle as claimed in claim 5 including means for varying the pressure of the gas supply to said closed space.

7. A vehicle as claimed in claim 1 wherein said flexible member comprises a series of inflatable tubes in side by side relation depending in a vertical direction from the lower part of the vehicle.

8. A vehicle as claimed in claim 7 including means for varying the inflation pressure of the tubes.

9. A vehicle as claimed in claim 1 wherein the first edge of the flexible member is attached to the bottom of the vehicle at a position inboard of the periphery of the vehicle, whereby deflection of the member upwards brings the outwardly extending portion of the flexible member into contact with a portion of the bottom surface of the vehicle and the effective periphery of the cushion space is moved outwards at the locality at which the flexible member is deflected.

10. A vehicle as claimed in claim 9 wherein the said portion of the bottom surface of the vehicle is profiled so as to vary the effect of the deflection of the flexible member.

11. A vehicle as claimed in claim 9 wherein the said portion of the bottom surface of the vehicle is movable vertically so as to vary the effect of the deflection of the flexible member.

12. A vehicle as claimed in claim 1 wherein the lower part of the vehicle includes a structure flexibly attached to the main body of the vehicle, and wherein the flexible member is attached to the lower part of said structure.

13. A vehicle as claimed in claim 1 wherein the flexible member extends entirely around the periphery of the vehicle.

14. A vehicle as claimed in claim 13 including at least one further flexible member extending across the bottom of the vehicle to subdivide the cushion space.

15. A vehicle as claimed in claim 1 including means on the convex face of said flexible member for disturbing the flow of gas over said convex face.

16. A vehicle as claimed in claim 15 wherein said gas flow disturbing means comprises a plurality of bead members spaced from one another and disposed in a row extending substantially normal to the cushion periphery.

17. A vehicle for travelling over a surface of the type which is supported above the surface by at least one cushion of pressurised gas formed and contained in a space beneath the vehicle, including a flexible skirt attached to the lower part of the vehicle containing the cushion for at least part of its periphery, said skirt comprising at least one inflatable, gas-retaining thin walled flexible member having first and second edges, the cross-sectional shape of said member normal to the periphery of the cushion space being a substantially continuous curve extending from said first edge initially in a direction outwardly away from the cushion space, thereafter extending downwardly and then inwardly and then upwardly, ending in said second edge, so as to present on its lower surface a continuous convex face which is presented towards the surface over which the vehicle is supported, the first edge of said flexible member being attached to the lower part of the vehicle and the second edge thereof lying below and being movable relative to the bottom surface of the vehicle, and means connecting the second edge of said flexible member to said bottom surface at a position inwards towards the centre of the cushion space relative to the position of said second edge, means for supplying gas directly to the cushion space without passing through the space within said flexible member, said flexible member being normally inflated to a pressure substantially equal to the cushion pressure and being free of internal restraint, whereby, under the action of the inflation pressure within said member and the flow of gas outwardly from the cushion space beneath the convex lower surface of said member, said member assumes a profile having a pressure distribution tending to maintain said lower surface clear of the surface over which the vehicle is supported, said flexible member being free to deflect both upwardly and downwardly from a normal position and to change in shape upon variations in the distance between the bottom surface of the vehicle and the surface over which the vehicle is supported, a general upwards deflection of said flexible member also causing an outward deflection thereof so that the centre of pressure of the vehicle supporting cushion moves outwardly and thereby exerts a stabilising effect on the vehicle.

References Cited by the Examiner

UNITED STATES PATENTS

| 3,096,728 | 7/1963 | Amann et al. | 180—7 |
| 3,161,247 | 12/1964 | Mackie | 180—7 |
| 3,172,494 | 3/1965 | Cockerell | 180—7 |
| 3,209,847 | 10/1965 | Beardsley | 180—7 |

FOREIGN PATENTS 925,425    5/1963    Great Britain.

BENJAMIN HERSH, *Primary Examiner.*

M. S. SALES, *Assistant Examiner.*